United States Patent
Chen (10) Patent No.: US 11,470,574 B2
(45) Date of Patent: Oct. 11, 2022

(54) METHOD AND DEVICE FOR DETERMINING POSITION OF PAGING FRAME, AND TERMINAL DEVICE

(71) Applicant: VIVO MOBILE COMMUNICATION CO., LTD., Chang'an Dongguan (CN)

(72) Inventor: Li Chen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/969,924

(22) PCT Filed: Feb. 3, 2019

(86) PCT No.: PCT/CN2019/074677
§ 371 (c)(1),
(2) Date: Aug. 13, 2020

(87) PCT Pub. No.: WO2019/158017
PCT Pub. Date: Aug. 22, 2019

(65) Prior Publication Data
US 2020/0413367 A1    Dec. 31, 2020

(30) Foreign Application Priority Data
Feb. 13, 2018 (CN) .......................... 201810150975.0

(51) Int. Cl.
*H04W 56/00* (2009.01)
*H04W 68/00* (2009.01)
(Continued)

(52) U.S. Cl.
CPC ....... *H04W 68/00* (2013.01); *H04W 52/0216* (2013.01); *H04W 52/0229* (2013.01); *H04W 56/001* (2013.01); *H04W 76/28* (2018.02)

(58) Field of Classification Search
CPC .................. H04W 84/02–16; H04W 88/00–06
See application file for complete search history.

(56) References Cited

U.S. PATENT DOCUMENTS

2007/0008915 A1    1/2007  Kim et al.
2007/0064662 A1*   3/2007  Bultan ................ H04W 52/287
                                                       455/401
(Continued)

FOREIGN PATENT DOCUMENTS

CN    105208640 A    12/2015
CN    106170930 A    11/2016
(Continued)

OTHER PUBLICATIONS

Extended European Search Report for related Application No. 19754504.9; dated Feb. 24, 2021.
(Continued)

*Primary Examiner* — San Htun
(74) *Attorney, Agent, or Firm* — von Briesen & Roper, s.c.

(57) ABSTRACT

A method and a device for determining a position of a paging frame, and a terminal device are provided. The method includes: determining a synchronization signal block in a discontinuous reception (DRX) cycle; and determining the position of the paging frame (PF) after a position where the synchronization signal block in the DRX cycle is located.

20 Claims, 2 Drawing Sheets

SFN

SSB

DRX cycle Tms (51) Int. Cl.
*H04W 76/28* (2018.01)
*H04W 52/02* (2009.01)

(56) References Cited

U.S. PATENT DOCUMENTS

| | | | |
|---|---|---|---|
| 2008/0182596 A1 | 7/2008 | Wang et al. | |
| 2009/0275368 A1* | 11/2009 | Wang | H04W 28/08 455/574 |
| 2010/0087210 A1 | 4/2010 | Lee et al. | |
| 2012/0079370 A1 | 3/2012 | Dejean | |
| 2015/0098381 A1* | 4/2015 | Cucala Garcia | H04W 52/0216 370/311 |
| 2016/0105869 A1* | 4/2016 | Namboodiri | H04W 76/28 370/330 |
| 2016/0119895 A1 | 4/2016 | Agiwal et al. | |
| 2017/0367069 A1* | 12/2017 | Agiwal | H04W 68/005 |
| 2018/0084523 A1 | 3/2018 | Uchiyama et al. | |
| 2018/0234920 A1* | 8/2018 | Bae | H04W 52/0216 |
| 2018/0332533 A1* | 11/2018 | Bhattad | H04W 52/0216 |

FOREIGN PATENT DOCUMENTS

| | | |
|---|---|---|
| CN | 107079404 A | 8/2017 |
| CN | 107409379 A | 11/2017 |
| EP | 3713316 A1 | 9/2020 |
| JP | 2010056740 A | 3/2010 |
| KR | 20080086045 A | 9/2008 |

OTHER PUBLICATIONS

South Korean Office Action for related Application No. 10-2020-7026213; dated Apr. 13, 2021.
Nokia, Nokia Shanghai Bell, "Paging in NR", Jan. 22-26, 2018, 3GPP TSG-RAN WG1 NR AH #18-01, Vancouver, Canada.
Qualcomm Incorporated, "Paging Design Consideration", Jan. 22-26, 2018, 3GPP TSG-RAN WG1 Meeting AH 1801, Vancouver, Canada.
Ericsson, "Paging Occasions in NR", Jan. 22-26, 2018, 3GPP TSG-RAN WG2 NR AH#3, Vancouver, Canada.
Sanechips ZTE, "Calculation of paging occasion in NR", Jan. 22-26, 2018, 3GPP TSG-RAN WG2 NR Ad hoc 1801, Vancouver, Canada.
International Search Report & Written Opinion related to Application No. PCT/CN2019/074677; dated Aug. 27, 2020.
Chinese Office Action for related Chinese Application No. 201810150975.0; dated Apr. 15, 2020.
Mediatek Inc., "Paging and SS Block Transmission in NR", Jan. 22-26, 2018, 3GPP TSG RAN WG2 Meeting AH-1801, Vancouver, Canada.
Japanese Office Action for related Application No. 2020-543278; dated Nov. 2, 2021.
Nokia, Nokia Shanghai Bell, "Determination of PF and PO in NR", Feb. 26-Mar. 2, 2018, 3GPP TSG-RAN WG2 Meeting #101, Athens, Greece.

* cited by examiner

METHOD AND DEVICE FOR DETERMINING POSITION OF PAGING FRAME, AND TERMINAL DEVICE

CROSS-REFERENCE TO RELATED APPLICATION

This patent application is a 35 USC § 371 U.S. national stage of International Application No. PCT/CN2019/074677 filed on Feb. 3, 2019, which claims a priority to Chinese Patent Application No. 201810150975.0 filed on Feb. 13, 2018, the disclosures of which are incorporated in their entireties by reference herein.

TECHNICAL FIELD

The present disclosure relates to the technical field of communications, in particular to a method and a device for determining a position of a paging frame, and a terminal device.

BACKGROUND

In the future $5^{th}$ Generation (5G) mobile communication systems, in order to achieve a downlink transmission rate of 20 Gbps and an uplink transmission rate of 10 Gbps, high-frequency communications and the large-scale antenna technology will be introduced.

High-frequency communications can provide a wider system bandwidth, and the size of an antenna can also be smaller, which is more conducive for large-scale antennas to be deployed in base stations and user equipment (User Equipment, UE) or terminal equipment.

High-frequency communications has disadvantages of large pathloss, susceptibility to interference, and a fragile link, while large-scale antenna technology can provide a large antenna gain. Therefore, a combination of high-frequency communications and large-scale antennas is an inevitable trend of the future 5G mobile communication systems.

In the 5G systems, currently, a periodicity of a synchronization signal block (SSB) may be 5 ms, 10 ms, 20 ms, 40 ms, 80 ms, and 160 ms. In the case of different periodicities of the SSB, if the paging frame calculation method in existing LTE systems continues to be used, some UEs may need to wake up ahead of a relatively long time to wait to receive a paging message, which causes a problem of a waste of electricity.

In the LTE systems, a time-domain position where the paging message is transmitted by a network side or received by a terminal side are determined based on PF and PO:

Paging Frame (PF): a radio frame used to transmit a paging message, which may include one or more POs; and Paging Occasion (PO): a paging slot, which may include a sub-frame where a terminal transmits a paging message.

When DRX (discontinuous reception) is enabled, in order to save power, the terminal only monitors its own PO per DRX cycle, and the frame number is from 0 to 1023.

UE_ID: IMSI MOD 1024, which is divided into 1024 groups according to IMSI.

T: a DRX cycle, which takes a value of rf32, rf64, rf128, or rf256, and the parameters are configured by the upper RRC layer.

i_s: a sub-frame mode, which is obtained by looking up a table.

nB: 4T, 2T, T, T/2, T/4, T/8, T/16, T/32. nB indicates how many POs are included in each DRX cycle, that is, 4T indicates that each radio frame has 4 sub-frames used for paging, and T/4 indicates that 4 radio frames have one sub-frame used for paging.

For a paging density, the greater the value is, the greater the paging density is. For example, nB=4T indicates that there are 4 POs in a radio frame. When the paging density is less than 1, it is controlled by Ns.

N: min(T, nB).

Ns: max(1, nB/T), which takes a value of 1, 2 or 4; Ns indicates how many POs are included in each radio frame, and the paging density configured as Ns=1 indicates that there is one paging PO in a radio frame, Ns=2 indicates that there are 2 POs in a radio frame, which is described as follows.

The PO definition rules in frequency division multiplexing (FDD) in the LTE systems are as follows:

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

If P-RNTI is transmitted on MPDCCH, and a system bandwidth is between 1.4 MHz and 3 MHz, and the PO definition rules are as follows:

| Ns | PO when i_s = 0 | PO when i_s = 1 | PO when i_s = 2 | PO when i_s = 3 |
|---|---|---|---|---|
| 1 | 5 | N/A | N/A | N/A |
| 2 | 5 | 5 | N/A | N/A |
| 4 | 5 | 5 | 5 | 5 |

The PO definition rules in time division multiplexing (TDD) in the LTE systems are as follows:

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

If P-RNTI is transmitted on MPDCCH, and the system bandwidth is between 1.4 MHz and 3 MHz, and the PO definition rules are as follows:

| Ns | PO when i_s = 0 | PO when i_s = 1 | PO when i_s = 2 | PO when i_s = 3 |
|---|---|---|---|---|
| 1 | 1 | N/A | N/A | N/A |
| 2 | 1 | 6 | N/A | N/A |
| 4 | 1 | 1 | 6 | 6 |

A relationship between the PF paging cycle and various parameters can be seen from the following PF determination formula, PF has a relationship with DRX cycle, and UE_ID, i.e., IMSI, as follows:

$PF:SFN \bmod T=(T \text{ div } N)*(UE\_ID \bmod N)$.

It can be seen from the following PO determination formula that the sub-frame pattern of PO is related to the UE_ID of the terminal, that is the IMSI, and the Ns paging density:

$PO:i\_s=\text{floor}(UE\_ID/N) \bmod Ns$.

Relationship between other parameters:

nB: 4T, 2T, T, T/2, T/4, T/8, T/16, T/32;

N: min(T, nB);

Ns: max(1, nB/T);

UE_ID: IMSI mod 1024.

In LTE, a periodicity of the synchronization signal is 5 ms. In order to receive a paging message in an idle mode, the UE wakes up in advance for more than 5 ms to receive a synchronization signal, thereby achieving synchronization.

However, in NR, when a periodicity of an SSB is relatively large, if the UE wakes up for too short a time, the UE cannot achieve synchronization before receiving a paging message, which may cause a low paging reception success rate. If the UE wakes up in order to achieve synchronization, the UE may wake up for a long time, which results in a waste of UE power consumption.

SUMMARY

Embodiments of the present disclosure provide a method and a device for determining a position of a paging frame, and a terminal device, so as to solve a problem of a low paging reception success rate in the related technologies.

In a first aspect, embodiments of the present disclosure provide a method for determining a position of a paging frame, which includes:

determining a synchronization signal block in a discontinuous reception (DRX) cycle; and determining the position of the paging frame (PF) after a position where the synchronization signal block in the DRX cycle is located.

In a second aspect, embodiments of the present disclosure further provide a device for determining a position of a paging frame, which includes:

a first determining module, configured to determine a synchronization signal block in a discontinuous reception (DRX) cycle; and a second determining module, configured to determine the position of the paging frame (PF) after a position where the synchronization signal block in the DRX cycle is located.

In a third aspect, embodiments of the present disclosure provide a terminal device, which includes a processor configured to: determine a synchronization signal block in a discontinuous reception (DRX) cycle; and determine the position of the paging frame (PF) after a position where the synchronization signal block in the DRX cycle is located.

In a fourth aspect, embodiments of the present disclosure provide a terminal device. The network device includes a processor, a memory, and a computer program that is stored in the memory and executable on the processor. When executing the computer program, the processor is configured to implement steps of the method for determining the position of the paging frame as described above.

In a fifth aspect, embodiments of the present disclosure provide a computer-readable storage medium. A computer program is stored on the computer-readable storage medium, and the computer program is executed by a processor to implement steps of the method for determining the position of the paging frame as described above.

In this way, based on the method for determining the position of the paging frame in the embodiments of the present disclosure, a synchronization signal block in a discontinuous reception (DRX) cycle is first determined; and then the position of the paging frame (PF) is determined after a position where the synchronization signal block in the DRX cycle is located. Thus, the terminal device can determine the position of the PF, thereby improving the paging reception success rate, and reducing power consumption of the terminal.

BRIEF DESCRIPTION OF THE DRAWINGS

In order to explain technical solutions of embodiments of the present disclosure more clearly, the drawings that need to be used in the description of the embodiments of the present disclosure will be briefly described hereinafter. Obviously, the drawings in the following description are only some embodiments of the present disclosure. Those of ordinary skill in the art can obtain other drawings based on these drawings without creative effort.

DETAILED DESCRIPTION

Exemplary embodiments of the present disclosure will be described below in more detail with reference to the accompanying drawings. Although the exemplary embodiments of the present disclosure are shown in the drawings, it should be understood that the present disclosure can be implemented in various forms and should not be limited by the embodiments set forth herein. Rather, these embodiments are provided to enable a more thorough understanding of the present disclosure and to fully convey the scope of the present disclosure to those skilled in the art.

Such terms as "first", "second" in the specification and claims of the present disclosure are used to distinguish similar objects without having to describe a particular order or sequence. It should be understood that data used in this manner may be interchangeable where appropriate so that the embodiments of the present application described herein can be implemented, for example, in a sequence other than those illustrated or described herein. Furthermore, such terms as "including" and "having" and any variant thereof are intended to cover non-exclusive inclusion, for example, processes, methods, systems, products or devices that include a series of steps or units are not necessarily limited to those clearly listed, but may include other steps or units that are not clearly listed or inherent to these processes, methods, products or devices.

Figure 1:
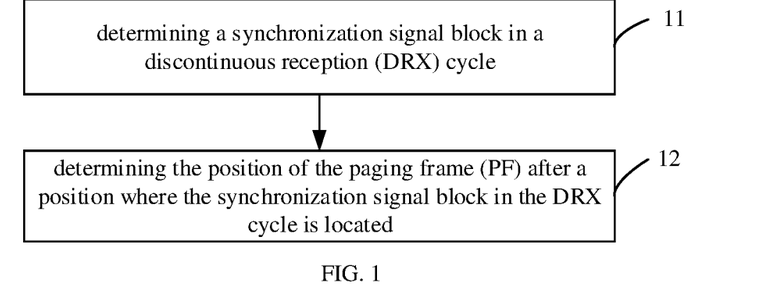
FIG. 1 shows a flowchart of a method for determining a position of a paging frame according to an embodiment of the present disclosure.

As shown in FIG. 1, a method for determining a position of a paging frame is provided according to an embodiment of the present disclosure and includes:

step 11, determining a synchronization signal block in a discontinuous reception (DRX) cycle; and step 12, determining the position of the paging frame (PF) after a position where the synchronization signal block in the DRX cycle is located.

In the method for determining the position of the paging frame in the embodiments of the present disclosure, a synchronization signal block in a discontinuous reception (DRX) cycle is first determined; and then the position of the paging frame (PF) is determined in a position after a position where the synchronization signal block in the DRX cycle is located. Thus, the terminal device can determine the position of the PF, thereby improving the paging reception success rate, and reducing power consumption of the terminal.

Figure 2:
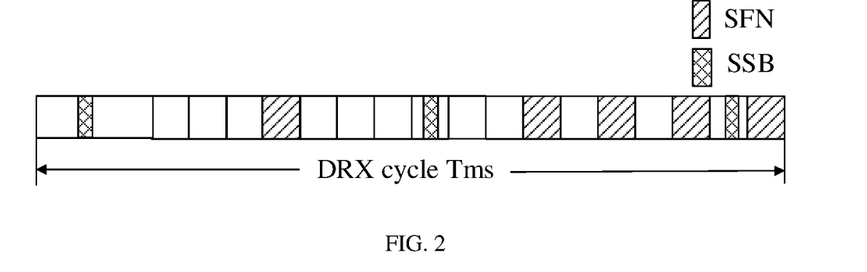
FIG. 2 shows a schematic diagram of a positional relationship between a synchronization signal block (SSB) and PF.

As shown in FIG. 2, in the above-mentioned embodiment of the present disclosure, the synchronization signal block (SSB) is a first SSB in the DRX cycle; or the SSB is any one or more SSBs of a plurality of SSBs in the DRX cycle.

Figure 3:
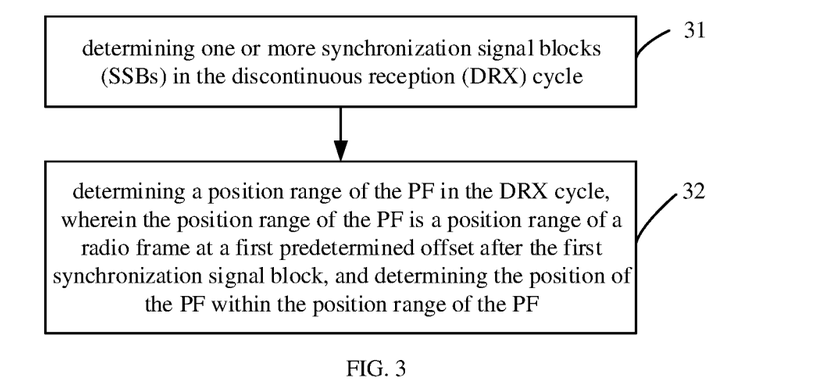
FIG. 3 shows another flowchart of a method for determining a position of a paging frame according to an embodiment of the present disclosure.

As shown in FIG. 3, a method for determining a position of a paging frame is provided according to another embodiment of the present disclosure, and includes:

step 31, determining one or more synchronization signal blocks (SSBs) in the discontinuous reception (DRX) cycle; and step 32, determining a position range of the PF in the DRX cycle, where the position range of the PF is a position range of a radio frame at a first predetermined offset after the first synchronization signal block, and determining the position of the PF within the position range of the PF.

The first predetermined offset herein is a value configured by a network device, or a value calculated according to a paging parameter configured by a network device. The paging parameter herein may be one or more of: UE_ID, a DRX cycle T, a sub-frame mode i_s, nB of how many POs are included in each DRX cycle, N=min(T, nB), or Ns=max (1, nB/T). When performing a specific configuration, the network device may perform configuration by using system information or a radio resource control (RRC) message.

In an embodiment, when step 32 is specifically implemented, step 32 may include:

step 321, determining the position of the paging frame (PF) within the position range of the paging frame (PF) according to an order of UE_ID; or step 322, calculating a remainder after a terminal identifier divides a first value to obtain a first result, dividing the DRX cycle by the first value to obtain a second result, multiplying the first result by the second result to obtain a first product; determining a frame number of the PF, and determining the position of the PF within the position range of the PF according to an order of the frame number (SFN) of the PF, where a result of the frame number of the PF modulus the DRX cycle is equal to the first product, the first value is the smaller one of the DRX cycle and the second value, and the second value is the number of paging occasions (POs) included in each DRX cycle.

Specifically, within the position range of the PF, the frame number of the PF is obtained according to a formula: SFN mod T=(T div N)*(UE_ID mod N), and the position of the paging frame (PF) is determined according to an order of the frame number SFN of the PF, where T is the DRX cycle, N is min(T, nB), SFN is the frame number of the PF, UE_ID is the terminal identifier, which is specifically IMSI MOD 1024, div is a division operation, and a value of nB is any one of 4T, 2T, T, T/2, T/4, T/8, T/16, or T/32.

Optionally, step 32 may include step 323: determining the position of the PF within the position range of the PF, according to a paging parameter configured by the network device. The paging parameter herein may be one or more of: UE_ID, a DRX cycle T, a sub-frame mode i_s, nB of how many POs are included in each DRX cycle, N=min(T, nB), or Ns=max(1, nB/T).

Further, in an embodiment, the method may further include step 33: mapping, according to a mapping relationship, the determined position of the PF to a transmission position after the synchronization signal block, where the mapping relationship herein may be predetermined, or configured by a network, or determined according to a parameter configured by a network.

The specific mapping may be achieved in the following manners:

a first manner: mapping the determined position of the paging frame (PF) to the transmission position after the synchronization signal block according to an order of UE_ID; or a second manner: mapping the determined position of the paging frame (PF) to the transmission position after the synchronization signal block according to an order of a frame number (SFN) of the PF, where the frame number of the PF is determined based on a second product of a third result and a fourth result, the third result is a remainder obtained by dividing the terminal identifier by the third value, and the fourth result is obtained by dividing the DRX cycle by the third value. A result of the frame number of the PF modulus the DRX cycle is equal to the second product, the third value is the smaller one of the DRX cycle and a fourth value, and the fourth value is the number of paging occasions (POs) included in each DRX cycle.

Specifically, the determined position of the paging frame (PF) is mapped to the transmission position after the synchronization signal block according to the order of the frame number (SFN) of the PF, and the frame number of the PF is determined by a formula: SFN mod T=(T div N)*(UE_ID mod N), where T is the DRX cycle, N is min(T, nB), SFN is the frame number of PF, UE_ID is the terminal identifier, which is specifically IMSI MOD 1024, div is a division operation, and a value of nB is any one of 4T, 2T, T, T/2, T/4, T/8, T/16, or T/32.

Alternatively, a third manner includes: mapping the determined position of the paging frame (PF) to the transmission position after the synchronization signal block according to a paging parameter configured by a network device.

In the embodiments of the present disclosure, the paging frame (PF) is located in the position range of the radio frame at the first predetermined offset after the first SSB in the DRX cycle. Specifically, the position of the PF may be specifically determined by using the above step 321, or 322, or 323, and the determined position of the PF is mapped to the corresponding transmission position, so that the terminal device can determine the position of the PF, so as to improve the paging success rate.

Figure 4:
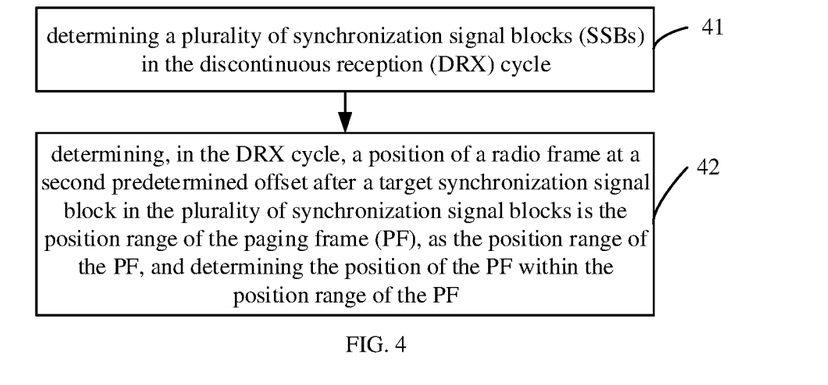
FIG. 4 shows another flowchart of a method for determining a position of a paging frame according to an embodiment of the present disclosure.

As shown in FIG. 4, a method for determining a position of a paging frame is provided according to an embodiment of the present disclosure and includes:

step 41, determining a plurality of synchronization signal blocks (SSBs) in the discontinuous reception (DRX) cycle; and step 42, determining, in the DRX cycle, a position of a radio frame at a second predetermined offset after a target synchronization signal block in the plurality of synchronization signal blocks is the position range of the paging frame (PF), as the position range of the PF, and determining the position of the PF within the position range of the PF.

The second predetermined offset is a value configured by the network device, or calculated according to a paging parameter configured by the network device. The paging parameter herein may be one or more of: UE_ID, a DRX cycle T, a sub-frame mode i_s, nB of how many POs are included in each DRX cycle, N=min(T, nB), or Ns=max(1, nB/T). When performing a specific configuration, the network device may perform configuration by using system information or a radio resource control (RRC) message.

In an embodiment, step 42 may specifically include: step 421, determining a position of a target synchronization signal block in the plurality of synchronization signal blocks in the DRX cycle.

In specific implementation, a result is obtained by calculating a remainder after a terminal identifier divides the number of PFs in the DRX cycle; a ratio of a multiple to the number of PFs in the DRX cycle is calculated, where the multiple is a multiple of the DRX cycle relative to a cycle of the synchronization signal block; and the position of the target synchronization signal block is determined according to a product of the result and the ratio, where a remainder obtained by dividing the position of the target synchronization signal block by the multiple is equal to the product.

Specifically, the position of the target synchronization signal block in the plurality of synchronization signal blocks may be determined according to a formula:

$$X \bmod Y = \frac{Y}{N} * (UE\_ID \bmod N),$$

where X is the position of the target synchronization signal block, the DRX cycle is Y times of the cycle of the synchronization signal block, N is the number of PFs in the DRX cycle, and UE_ID is the terminal identifier. N is a value configured by a network device, or a value calculated according to a paging parameter configured by a network device. When performing a specific configuration, the network device may perform configuration by using system information or a radio resource control (RRC) message.

Step 422 includes determining, as the position range of the paging frame (PF), the position of the radio frame at the second predetermined offset after the target synchronization signal block;

Step 423 includes determining the position of the paging frame (PF) within the position range of the paging frame (PF). When the step 423 is specifically implemented, it may include:

step 4231, determining the position of the paging frame (PF) within the position range of the paging frame (PF) according to an order of UE_ID; or step 4232, calculating a remainder after a terminal identifier divides a first value to obtain a first result, dividing the DRX cycle by the first value to obtain a second result, multiplying the first result by the second result to obtain a first product; determining a frame number of the PF, and determining the position of the PF within the position range of the PF according to an order of the frame number (SFN) of the PF, where a result of the frame number of the PF modulus the DRX cycle is equal to the first product, the first value is the smaller one of the DRX cycle and the second value, and the second value is the number of paging occasions (POs) included in each DRX cycle.

Specifically, within the position range of the PF, the frame number of the PF is obtained according to a formula: SFN mod T=(T div N)*(UE_ID mod N), and the position of the paging frame (PF) is determined according to an order of the frame number SFN of the PF, where T is the DRX cycle, N is min(T, nB), SFN is the frame number of the PF, UE_ID is the terminal identifier, which is specifically IMSI MOD 1024, div is a division operation, and a value of nB is any one of 4T, 2T, T, T/2, T/4, T/8, T/16, or T/32.

Optionally, step 423 may include step 4233: determining the position of the PF within the position range of the PF, according to a paging parameter configured by the network device. The paging parameter herein may be one or more of: UE_ID, a DRX cycle T, a sub-frame mode i_s, nB of how many POs are included in each DRX cycle, N=min(T, nB), or Ns=max(1, nB/T).

Further, in an embodiment, the method may further include step 43: mapping the determined position of the PF to a transmission position after the synchronization signal block according to a mapping relationship, where the mapping relationship herein may be predetermined, or configured by a network, or determined according to a parameter configured by a network.

The specific mapping can be achieved in the following manners:

a first manner: mapping the determined position of the paging frame (PF) to the transmission position after the synchronization signal block according to an order of UE_ID; or a second manner: mapping the determined position of the paging frame the paging frame (PF) to the transmission position after the synchronization signal block according to an order of the frame number (SFN) of the PF, where the frame number of the PF is determined based on a second product of a third result and a fourth result, the third result is a remainder obtained by dividing the terminal identifier by the third value, and the fourth result is obtained by dividing the DRX cycle by the third value. A result of the frame number of the PF modulus the DRX cycle is equal to the second product, the third value is the smaller one of the DRX cycle and a fourth value, and the fourth value is the number of paging occasions (POs) included in each DRX cycle.

Specifically, the determined position of the paging frame (PF) is mapped to the transmission position after the synchronization signal block according to an order of the frame number SFN of the PF, and the frame number of the PF is obtained according to a formula: SFN mod T=(T div N)* (UE_ID mod N), and the position of the paging frame (PF) is determined according to an order of the frame number SFN of the PF, where T is the DRX cycle, N is min(T, nB), SFN is the frame number of the PF, UE_ID is the terminal identifier, which is specifically IMSI MOD 1024, div is a division operation, and a value of nB is any one of 4T, 2T, T, T/2, T/4, T/8, T/16, or T/32.

Alternatively, a third manner includes: mapping the determined position of the paging frame (PF) to the transmission position after the synchronization signal block according to a paging parameter configured by the network device.

In the embodiments of the present disclosure, the paging frame (PF) is located in the position range of the radio frame at the second predetermined offset after any target SSB of the plurality of SSBs in the DRX cycle. Specifically, the position of the PF may be specifically determined by using the above step 4231, or 4232, or 4233, and the determined position of the PF is mapped to the corresponding transmission position, so that the terminal device can determine the position of the PF, thereby improving the paging success rate, and reducing the power consumption of the terminal.

The above-mentioned embodiments of the present disclosure can be applied in 5G, or eLTE, or other scenarios where a position of a similar message is determined.

Figure 5:
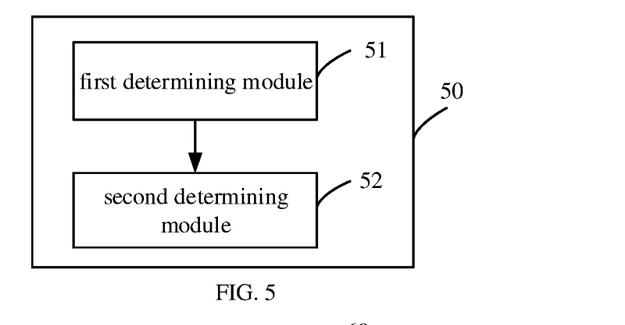
FIG. 5 shows a block diagram of modules of a device for determining a position of a paging frame according to an embodiment of the present disclosure.

As shown in FIG. 5, an embodiment of the present disclosure further provides a device 50 for determining a position of a paging frame, including: a first determining module 51, configured to determine a synchronization signal block in a discontinuous reception (DRX) cycle; and a second determining module 52, configured to determine the position of the paging frame (PF) after a position where the synchronization signal block in the DRX cycle is located.

The synchronization signal block is a first synchronization signal block in the DRX cycle; or the synchronization signal block is any one or more synchronization signal blocks among a plurality of synchronization signal blocks in the DRX cycle.

In an embodiment of the present disclosure, the second determining module 52 is specifically configured to determine a position range of the paging frame (PF), where the position range of the paging frame (PF) is a position range of a radio frame at a first predetermined offset after the first synchronization signal block; and determine the position of the paging frame (PF) within the position range of the paging frame (PF).

The first predetermined offset is a value configured by a network device, or a value calculated according to a paging parameter configured by a network device.

In an embodiment of the present disclosure, the second determining module 52 may also be specifically configured to: determine a position of a target synchronization signal block in the plurality of synchronization signal blocks; determine, as the position range of the paging frame (PF), a position of a radio frame at a second predetermined offset after the target synchronization signal block; and determine the position of the paging frame (PF) within the position range of the paging frame (PF).

When determining the position of the target synchronization signal block in the plurality of synchronization signal blocks, the second determining module 52 is specifically configured to: calculate a remainder after a terminal identifier divides the number of PFs in the DRX cycle to obtain a result; calculate a ratio of a multiple to the number of PFs in the DRX cycle, where the multiple is a multiple of the DRX cycle relative to the cycle of the synchronization signal block; and determine the position of the target synchronization signal block according to the product of the result and the ratio, where a remainder obtained by dividing the position of the target synchronization signal block by the multiple is equal to the product.

Specifically, the position of the target synchronization signal block in the plurality of synchronization signal blocks may be determined according to a formula:

$$X \bmod Y = \frac{Y}{N} * (\text{UE\_ID} \bmod N),$$

where X is the position of the target synchronization signal block, the DRX cycle is Y times of a cycle of the synchronization signal block, N is the number of PFs in the DRX cycle, and UE_ID is the terminal identifier. N is a value configured by a network device, or a value calculated according to a paging parameter configured by a network device.

In an embodiment of the present disclosure, when determining the position of the paging frame (PF) within the position range of the paging frame (PF), the second determining module 52 is specifically configured to: determine the position of the paging frame (PF) within the position range of the paging frame (PF) according to an order of UE_ID; or calculate a remainder after the terminal identifier divides a first value to obtain a first result, divide the DRX cycle by the first value to obtain a second result, multiply the first result by the second result to obtain a first product, determine a frame number of the PF, and determine the position of the PF within the position range of the PF according to an order of the frame number (SFN) of the PF, where a result of the frame number of the PF modulus the DRX cycle is equal to the first product, the first value is the smaller one of the DRX cycle and the second value, and the second value is the number of paging occasions (POs) included in each DRX cycle, where, specifically, within the position range of the PF, the frame number of the PF is obtained according to a formula: SFN mod T=(T div N)*(UE_ID mod N), and the position of the paging frame (PF) is determined according to an order of the frame number SFN of the PF, where T is the DRX cycle, N is min(T, nB), SFN is the frame number of the PF, UE_ID is the terminal identifier, which is specifically IMSI MOD 1024, div is a division operation, and a value of nB is any one of 4T, 2T, T, T/2, T/4, T/8, T/16, or T/32; or determine the position of the PF within the position range of the PF, according to a paging parameter configured by a network device.

In a specific embodiment of the present disclosure, the device for determining the position of the paging frame may further include a mapping module, configured to map, according to a mapping relationship, the determined position of the paging frame (PF) to a transmission position after the synchronization signal block. The mapping relationship herein may be predetermined, or configured by a network, or determined according to a parameter configured by a network.

The mapping module is specifically configured to: map the determined position of the paging frame (PF) to the transmission position after the synchronization signal block according to an order of UE_ID; or map the determined position of the paging frame the paging frame (PF) to the transmission position after the synchronization signal block according to an order of the frame number (SFN) of the PF, where the frame number of the PF is determined based on a second product of a third result and a fourth result, the third result is a remainder obtained by dividing the terminal identifier by the third value, and the fourth result is obtained by dividing the DRX cycle by the third value. A result of the frame number of the PF modulus the DRX cycle is equal to the second product, the third value is the smaller one of the DRX cycle and a fourth value, and the fourth value is the number of paging occasions (POs) included in each DRX cycle, where, specifically, the determined position of the paging frame (PF) is mapped to the transmission position after the synchronization signal block according to an order of the frame number SFN of the PF, and the frame number of the PF is obtained according to a formula: SFN mod T=(T div N)*(UE_ID mod N), and the position of the paging frame (PF) is determined according to an order of the frame number SFN of the PF, where T is the DRX cycle, N is min(T, nB), SFN is the frame number of the PF, UE_ID is the terminal identifier, which is specifically IMSI MOD 1024, div is a division operation, and a value of nB is any one of 4T, 2T, T, T/2, T/4, T/8, T/16, or T/32; or map the determined position of the paging frame (PF) to the transmission position after the synchronization signal block according to a paging parameter configured by a network device.

It is worth noting that the device for determining the position of the paging frame in these embodiments of the present disclosure adopts the same implementation means as the above method. All the implementation manners in the above method are applicable to the embodiments of the device, and the same technical effects can be achieved.

It should be noted that division of the above modules should be understood as only a logical division, which may be integrated into a physical entity or physically separated from each other in practice. All these modules may be implemented in the form of software invoked by a processing element, or in the form of hardware; or some modules may be implemented in the form of software invoked by a processing element, while some other modules may be implemented in the form of hardware. For example, the determining module may be a separately arranged processing element, or may be integrated into a chip of the above device, or may be stored in a memory of the above device in the form of program code, where functions of the determining module are invoked and executed by a processing element of the above device. An implementation of other module is similar to that of the determining module. In addition, all or part of these modules can be integrated together or implemented independently. The processing element described herein may be an integrated circuit with signal processing capability. During implementations, various steps in the above-mentioned method or various modules may be completed by the integrated logic circuit in the form of hardware in the processing element or by instructions in the form of software.

For example, the above modules may be one or more integrated circuits configured to implement the above methods, such as one or more application specific integrated circuits (Application Specific Integrated Circuits, ASICs), one or more digital signal processors (Digital Signal Processors, DSPs), or one or more field programmable gate arrays (Field Programmable Gate Arrays, FPGAs). For another example, when one of the above modules is implemented in the form of a processing element invoking codes, the processing element may be a general purpose processor, such as a central processing unit (Central Processing Unit, CPU) or another processor that can invoke program codes. For another example, these modules may be integrated together in the form of system-on-a-chip (System-On-a-Chip, SOC).

In order to better achieve the above objectives, a terminal device 50 is further provided according to an embodiment of the present disclosure. The terminal device 50 includes a processor configured to: determine a synchronization signal block in a discontinuous reception (DRX) cycle; and determine the position of the paging frame (PF) after a position where the synchronization signal block in the DRX cycle is located.

Figure 6:
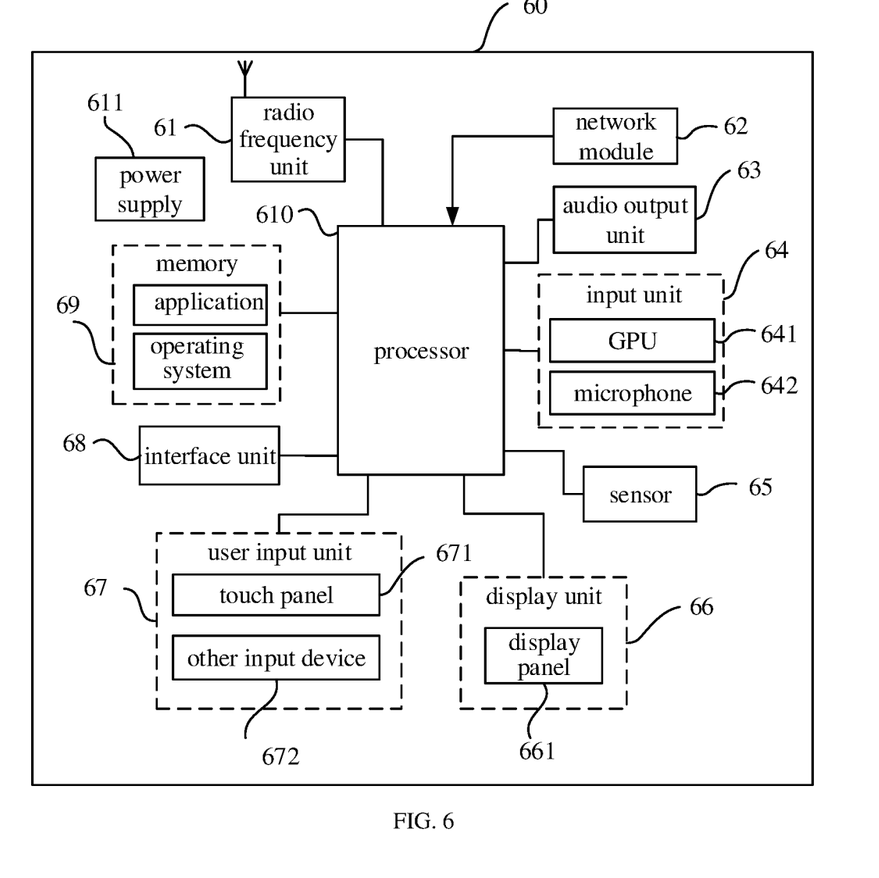
FIG. 6 shows a schematic structural diagram of a terminal device according to an embodiment of the present disclosure.

FIG. 6 is a schematic diagram of a hardware structure of a terminal device according to various embodiments of the present disclosure. The terminal device 60 includes but is not limited to: a radio frequency unit 61, a network module 62, an audio output unit 63, an input unit 64, a sensor 65, a display unit 66, a user input unit 67, an interface unit 68, a memory 69, a processor 610, a power supply 611, and other components.

Those skilled in the art may understand that the terminal structure shown in FIG. 6 does not constitute a limitation on the terminal, and the terminal may include more or fewer components than these as shown in FIG. 6, or may combine certain components, or may have different component arrangements. In the embodiments of the present disclosure, the terminal includes but is not limited to a mobile phone, a tablet computer, a notebook computer, a palmtop computer, an in-vehicle terminal, a wearable device, and a pedometer.

The processor 610 is configured to determine a synchronization signal block in a discontinuous reception (DRX) cycle; and determine the position of the paging frame (PF) after a position where the synchronization signal block in the DRX cycle is located.

The terminal device according to the embodiments of the present disclosure determines a synchronization signal block in a discontinuous reception (DRX) cycle, and then determines the position of the paging frame (PF) after a position where the synchronization signal block in the DRX cycle is located, so that the terminal device can determine the position of the PF, thereby improving the paging reception success rate, and reducing power consumption of the terminal.

It should be understood that, in the embodiments of the present disclosure, the radio frequency unit 61 may be configured to receive and send information, or to receive and send signals in a call. Specifically, the radio frequency unit 50 delivers the downlink information received from a base station to the processor 610. Generally, the radio frequency unit 61 includes, but is not limited to, an antenna, at least one amplifier, a transceiver, a coupler, a low noise amplifier, a duplexer, or the like. In addition, the radio frequency unit 61 may communicate with a network or other devices via a wireless communication system.

The terminal provides users with wireless broadband Internet access via the network module 62, such as helping users send and receive emails, browse web pages and access streaming media.

The audio output unit 63 may convert audio data received by the radio frequency unit 61 or the network module 62 or stored in the memory 69 into audio signals and output them as sound. Moreover, the audio output unit 63 may provide audio output (for example, call signal reception sound, message reception sound, etc.) related to a specific function performed by the terminal device 60. The audio output unit 63 includes a speaker, a buzzer, a receiver, or the like.

The input unit 64 is configured to receive audio or video signals. The input unit 64 may include a graphics processing unit (Graphics Processing Unit, GPU) 641 and a microphone 642. The graphics processor 641 is configured to process image data of still pictures or videos obtained via an image capture device (such as a camera) in an image capture mode or a video capture mode. The processed image frames may be displayed on the display unit 66. The image frames processed by the graphics processor 641 may be stored in the memory 69 (or other storage medium) or transmitted via the radio frequency unit 61 or the network module 62. The microphone 642 may receive sound, and may process the sound into audio data. The processed audio data may be converted into a format that can be transmitted to a mobile communication base station for outputting via the radio frequency unit 61 in the case of a telephone call mode.

The terminal device 60 further includes at least one sensor 65, such as an optical sensor, a motion sensor, or other sensors. Specifically, the optical sensor includes an ambient light sensor and a proximity sensor. The ambient light sensor may adjust brightness of the display panel 661 according to the brightness of the ambient light, and the proximity sensor may close the display panel 661 and/or backlight when the terminal device 60 approaches to the ear. As a type of motion sensor, an accelerometer sensor may detect the magnitude of acceleration in various directions (usually three-axis directions), and detect the magnitude and direction of gravity when in the stationary state. The accelerometer sensor may be applied to identify the pose of the terminal (such as switching of horizontal and vertical screen, a correlated game, magnetometer pose calibration), a function about vibration recognition (such as pedometer, tapping). The sensor 65 may also include a fingerprint sensor, a pressure sensor, an iris sensor, a molecular sensor, a gyroscope, a barometer, a hygrometer, a thermometer, an infrared sensors, or the like, which are not described herein.

The display unit 66 is configured to display information input by the user or information provided for the user. The display unit 66 may include a display panel 661. The display panel 661 may be configured in the form of a liquid crystal display (Liquid Crystal Display, LCD), an organic light-emitting diode (Organic Light-Emitting Diode, OLED), or the like.

The user input unit 67 may be configured to receive inputted numeric or character information, and generate key signal inputs related to user settings and function control of the terminal. Specifically, the user input unit 67 includes a touch panel 671 and other input device 672. The touch panel 671, also known as a touch screen, may collect a touch operation of a user thereon or thereby (for example, an operation on or around the touch panel 671 that is made by a user with a finger, a touch pen or any other suitable object or accessory). The touch panel 671 may include two parts: a touch detection device and a touch controller. The touch detection device detects touch orientation of the user, detects a signal caused by the touch operation, and transmits the signal to the touch controller. The touch controller receives touch information from the touch detection device, converts the touch information into contact coordinates, and transmits the contact coordinates to the processor 610. The touch controller may receive a command from by the processor 610 and executes the command In addition, the touch panel 671 may be implemented by various types such as a resistive panel, a capacitive panel, an infrared panel, or a surface acoustic wave panel. In addition to the touch panel 671, the user input unit 67 may include other input device 672. Specifically, the other input device 672 may include, but is not limited to, a physical keyboard, a function key (such as a volume control key, a switch key), a trackball, a mouse, or a joystick, which are not described herein.

Further, the display panel 661 may be covered by the touch panel 671. When the touch panel 671 detects a touch operation on or near the touch panel 671, the touch panel 671 transmits the touch operation to the processor 610 to determine the type of the touch event, and the processor 610 provides a corresponding visual output on the display panel 661 according to the type of touch event. Although the touch panel 671 and the display panel 661 are implemented as two independent components to implement the input and output functions of the terminal in FIG. 6, in some embodiments, the touch panel 671 and the display panel 661 may be integrated to implement the input and output functions of the terminal, which are not limited herein.

The interface unit 68 is an interface through which an external device is connected to the terminal device 60. For example, the external device may include a wired or wireless headset port, an external power (or battery charger) port, a wired or wireless data port, a memory card port, a port for connecting a device with an identity module, an audio input/output (I/O) port, a video I/O port, a headphone port, etc. The interface unit 68 may be configured to receive input (e.g., data information, power, etc.) from an external device and transmit the received input to one or more elements in the terminal device 60 or may be configured to transmit data between the terminal device 60 and the external device.

The memory 69 may be configured to store software programs and various data. The memory 69 may mainly include a program storage area and a data storage area, where the program storage area may store an operating system, an application program (such as a sound playback function, an image playback function, etc.) required for at least one function; the data storage area may store data (such as audio data, a phone book, etc.) created according to the use of the mobile phone. In addition, the memory 69 may include a high-speed random access memory, and may further include a non-volatile memory, such as at least one magnetic disk storage device, a flash memory device, or other volatile solid-state storage device.

The processor 610 is a control center of the terminal, which uses various interfaces and lines to connect various parts of the entire terminal. The processor 610 runs or executes software programs and/or modules stored in the memory 69 and calls data stored in the memory 69, to execute various functions of the terminal and process data, so as to monitor the terminal as a whole. The processor 610 may include one or more processing units. Optionally, the processor 610 may integrate an application processor and a modem processor. The application processor mainly processes an operating system, a user interface, an application program, etc., and the modem processor mainly processes wireless communications. It can be understood that the foregoing modem processor may not be integrated into the processor 610.

The terminal device 60 may further include a power supply 611 (such as a battery) for supplying power to various components. Optionally, the power supply 611 may be logically connected to the processor 610 through a power management system, so as to implement functions, such as management of charging and discharging, and power consumption management, via the power management system.

In addition, the terminal device 60 may include some functional modules that are not shown, which are not described herein again.

Optionally, embodiments of the present disclosure further provide a terminal device, including a processor 610, a memory 69, and a computer program stored on the memory 69 and executable by the processor 610. When executing the computer program, the processor 610 is configured to implement various processes of the above embodiments about the method for determining the position of the paging frame, and the same technical effect can be achieved. To avoid repetition, they will not be repeated herein. The terminal may be a wireless terminal or a wired terminal. The wireless terminal may be a device that provides data connectivity of voices and/or other services to a user, a handheld device with a wireless communication function, or other processing devices connected to a wireless modem. A wireless terminal may communicate with one or more core networks over a radio access network (Radio Access Network, RAN). The wireless terminal may be a mobile terminal such as a mobile phone (also referred to as a "cellular" phone) and a computer with a mobile terminal, which, for example, may be a portable, pocket-size, handheld, computer-built or vehicle-mounted mobile device. The wireless terminal exchanges language and/or data with a wireless access network, and may include a personal communication service (Personal Communication Service, PCS) phone, a cordless phone, a session initiation protocol (Session Initiation Protocol, SIP) phone, a wireless local loop (Wireless Local Loop, WLL) station, a personal digital assistant (Personal Digital Assistant, PDA), and other devices. The wireless terminal may also be: a system, a subscriber unit, a subscriber station, a mobile station, a remote station, a remote terminal, an access terminal, a user terminal, a user agent, a user device or a user equipment, which is not limited herein.

Embodiments of the present disclosure further provide a computer-readable storage medium. A computer program is stored on the computer-readable storage medium. The computer program is executed by a processor to implement various processes of the above embodiments about the method for determining the position of the paging frame, and the same technical effect can be achieved. To avoid repetition, they will not be repeated herein. The computer-readable storage medium may be, for example, a read-only memory (ROM for short), a random access memory (RAM for short), a magnetic disk or an optical disk, etc.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but the implementation should not be considered as going beyond the scope of the present disclosure.

It may be clearly understood by a person skilled in the art that, for ease of description and conciseness, for a detailed working process of the foregoing system, device, and unit, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, essential part or the part contributing to the prior art of the technical solutions of the present disclosure, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present disclosure. The foregoing storage medium includes any medium that may store program code, such as a universal serial bus (USB) flash drive, a mobile hard disk, an ROM, an RAM, a magnetic disk, or an optical disc.

Further, it is noted, apparently, the components or steps in the apparatus and method of the present disclosure may be subdivided and/or recombined. These subdivisions and/or recombinations should be considered as equivalent solutions to the present disclosure. Moreover, the steps of the foregoing series of process may be performed naturally in a chronological order in which the steps are described, however, the steps are not necessarily performed in the chronological order. Instead, some steps may be performed concurrently or independently of each other. It is appreciated by a person of ordinary skill in the art that, all or any steps or components of the method and apparatus of the present disclosure may be implemented in form of hardware, firmware, software or a combination thereof in any computing device (including a processor, storage medium or the like) or a network of computing devices, which may be realized by a person of ordinary skill in the art, having read the description of the present disclosure, and using basic programing skills.

Therefore, the objective of the present disclosure may further be achieved by running a program or a group of programs on any computing device. The computing device may be a well-known and general-purpose device. Thus, the objective of the present disclosure may further be achieved by providing a program product including program codes configured to implement the method or apparatus. In other words, such a program product constitutes the present disclosure, and a storage medium storing such a program product also constitutes the present disclosure. Obviously, the storage medium may be any well-known storage medium or any storage medium to be developed in the future. It is also noted, apparently, the components or steps in the apparatus and method of the present disclosure may be subdivided and/or recombined. These subdivisions and/or recombinations should be considered as equivalent solutions to the present disclosure. Moreover, the steps of the foregoing series of process may be performed naturally in a chronological order in which the steps are described, however, the steps are not necessarily performed in the chronological order. Instead, some steps may be performed concurrently or independently of each other.

Optional implementations of the present disclosure are described above. It should be noted that, numerous modifications and improvements may be made by a person of ordinary skill in the art without departing from the principles of the present disclosure, and these modifications and improvements shall also fall within the protection scope of the present disclosure.

What is claimed is:

1. A method for determining a position of a paging frame, comprising:
   determining a synchronization signal block in a discontinuous reception (DRX) cycle; and
   determining the position of the paging frame (PF) after a position where the synchronization signal block in the DRX cycle is located,
   wherein the synchronization signal block is a first synchronization signal block in the DRX cycle; or
   the synchronization signal block is any one or more synchronization signal blocks among a plurality of synchronization signal blocks in the DRX cycle, wherein the determining the position of the paging frame (PF) comprises:
determining a position range of the paging frame (PF), wherein the position range of the paging frame (PF) is a position range of a radio frame at a first predetermined offset after the first synchronization signal block; and
determining the position of the paging frame (PF) within the position range of the paging frame (PF),
or,
wherein the determining the position of the paging frame (PF) comprises:
determining a position of a target synchronization signal block in the plurality of synchronization signal blocks;
determining, as the position range of the paging frame (PF), a position of a radio frame at a second predetermined offset after the target synchronization signal block; and
determining the position of the paging frame (PF) within the position range of the paging frame (PF).

2. The method for determining the position of the paging frame according to claim 1, wherein the first predetermined offset is a value configured by a network device, or a value calculated according to a paging parameter configured by a network device.

3. The method for determining the position of the paging frame according to claim 1, wherein the determining the position of the target synchronization signal block in the plurality of synchronization signal blocks comprises:
calculating a remainder after a terminal identifier divides the number of PFs in the DRX cycle to obtain a result;
calculating a ratio of a multiple to the number of PFs in the DRX cycle, wherein the multiple is a multiple of the DRX cycle relative to a cycle of the synchronization signal block; and
determining the position of the target synchronization signal block according to the product of the result and the ratio, wherein a remainder obtained by dividing the position of the target synchronization signal block by the multiple is equal to the product.

4. The method for determining the position of the paging frame according to claim 3, wherein the number of PFs in the DRX cycle is a value configured by a network device, or a value determined according to a paging parameter configured by a network device; and
the second predetermined offset is a value configured by the network device, or a value determined according to a paging parameter configured by the network device.

5. The method for determining the position of the paging frame according to claim 1, wherein the determining the position of the paging frame (PF) within the position range of the paging frame (PF) comprises:
determining the position of the paging frame (PF) within the position range of the paging frame (PF) according to an order of a terminal identifier; or
calculating a remainder after the terminal identifier divides a first value to obtain a first result, dividing the DRX cycle by the first value to obtain a second result, multiplying the first result by the second result to obtain a first product, determining a frame number of the PF, and determining the position of the paging frame (PF) within the position range of the paging frame (PF) according to an order of the frame number (SFN) of the PF, wherein a result of the frame number of the PF modulus the DRX cycle is equal to the first product, and the first value is the number of PFs in the DRX cycle; or
determining the position of the paging frame (PF) within the position range of the paging frame (PF), according to a paging parameter configured by a network device.

6. The method for determining the position of the paging frame according to claim 1, further comprising:
mapping, according to a mapping relationship, the determined position of the paging frame (PF) to a transmission position after the synchronization signal block.

7. The method for determining the position of the paging frame according to claim 6, wherein the mapping relationship is predetermined, or is configured by a network device, or is determined according to a parameter configured by a network device.

8. The method for determining the position of the paging frame according to claim 6, wherein the mapping the determined position of the paging frame (PF) to the transmission position after the synchronization signal block comprises:
mapping the determined position of the paging frame (PF) to the transmission position after the synchronization signal block according to an order of a terminal identifier; or
mapping the determined position of the paging frame (PF) to the transmission position after the synchronization signal block according to an order of a frame number (SFN) of the PF, wherein the frame number of the PF is determined based on a second product of a third result and a fourth result, the third result is a remainder obtained by dividing the terminal identifier by the third value, the fourth result is obtained by dividing the DRX cycle by the third value, a result of the frame number of the PF modulus the DRX cycle is equal to the second product, the third value is a smaller one of the DRX cycle and a fourth value, and the fourth value is the number of paging occasions (POs) comprised in each DRX cycle; or
mapping the determined position of the paging frame (PF) to the transmission position after the synchronization signal block according to a paging parameter configured by a network device.

9. A device for determining a position of a paging frame, comprising a processor configured to:
determine a synchronization signal block in a discontinuous reception (DRX) cycle; and
determine the position of the paging frame (PF) after a position where the synchronization signal block in the DRX cycle is located,
wherein the synchronization signal block is a first synchronization signal block in the DRX cycle; or
the synchronization signal block is any one or more synchronization signal blocks among a plurality of synchronization signal blocks in the DRX cycle,
wherein the processor is further configured to:
determine a position range of the paging frame (PF), wherein the position range of the paging frame (PF) is a position range of a radio frame at a first predetermined offset after the first synchronization signal block; and
determine the position of the paging frame (PF) within the position range of the paging frame (PF),
or,
wherein the processor is further configured to:
determine a position of a target synchronization signal block in the plurality of synchronization signal blocks;
determine, as the position range of the paging frame (PF), a position of a radio frame at a second predetermined offset after the target synchronization signal block; and determine the position of the paging frame (PF) within the position range of the paging frame (PF).

10. The device for determining the position of the paging frame according to claim 9, wherein when determining the position of the target synchronization signal block in the plurality of synchronization signal blocks, the processor is further configured to:
calculate a remainder after a terminal identifier divides the number of PFs in the DRX cycle to obtain a result;
calculate a ratio of a multiple to the number of PFs in the DRX cycle, wherein the multiple is a multiple of the DRX cycle relative to a cycle of the synchronization signal block; and
determine the position of the target synchronization signal block according to the product of the result and the ratio, wherein a remainder obtained by dividing the position of the target synchronization signal block by the multiple is equal to the product.

11. The device for determining the position of the paging frame according to claim 10, wherein the number of PFs in the DRX cycle is a value configured by a network device, or a value determined according to a paging parameter configured by a network device; and
the second predetermined offset is a value configured by the network device, or a value determined according to a paging parameter configured by the network device.

12. The device for determining the position of the paging frame according to claim 9, wherein in determining the position of the paging frame (PF) within the position range of the paging frame (PF), the processor is configured to:
determine the position of the paging frame (PF) within the position range of the paging frame (PF) according to an order of a terminal identifier; or
calculate a remainder after the terminal identifier divides a first value to obtain a first result, divide the DRX cycle by the first value to obtain a second result, multiply the first result by the second result to obtain a first product, determine a frame number of the PF, and determine the position of the paging frame (PF) within the position range of the paging frame (PF) according to an order of the frame number (SFN) of the PF, wherein a result of the frame number of the PF modulus the DRX cycle is equal to the first product, and the first value is the number of PDFs in the DXR cycle; or
determine the position of the paging frame (PF) within the position range of the paging frame (PF), according to a paging parameter configured by a network device.

13. The device for determining the position of the paging frame according to claim 9, wherein the processor is further configured to map, according to a mapping relationship, the determined position of the paging frame (PF) to a transmission position after the synchronization signal block.

14. The device for determining the position of the paging frame according to claim 13, wherein the processor is further configured to:
map the determined position of the paging frame (PF) to the transmission position after the synchronization signal block according to an order of a terminal identifier; or
map the determined position of the paging frame (PF) to the transmission position after the synchronization signal block according to an order of a frame number (SFN) of the PF, wherein the frame number of the PF is determined based on a second product of a third result and a fourth result, the third result is a remainder obtained by dividing a terminal identifier by the third value, the fourth result is obtained by dividing the DRX cycle by the third value, a result of the frame number of the PF modulus the DRX cycle is equal to the second product, the third value is a smaller one of the DRX cycle and a fourth value, and the fourth value is the number of paging occasions (POs) comprised in each DRX cycle; or
map the determined position of the paging frame (PF) to the transmission position after the synchronization signal block according to a paging parameter configured by a network device.

15. The device for determining the position of the paging frame according to claim 9, wherein the first predetermined offset is a value configured by a network device, or a value calculated according to a paging parameter configured by a network device.

16. A non-transient computer-readable storage medium, wherein a computer program is stored on the computer-readable storage medium, and the computer program is executed by a processor to;
determine a synchronization signal block in a discontinuous reception (DRX) cycle; and
determine the position of the paging frame (PF) after a position where the synchronization signal block in the DRX cycle is located,
wherein the synchronization signal block is a first synchronization signal block in the DRX cycle; or
the synchronization signal block is any one or more synchronization signal blocks among a plurality of synchronization signal blocks in the DRX cycle,
wherein the determining the position of the paging frame (PF) comprises:
determining a position range of the paging frame (PF), wherein the position range of the paging frame (PF) is a position range of a radio frame at a first predetermined offset after the first synchronization signal block; and
determining the position of the paging frame (PF) within the position range of the paging frame (PF),
or,
wherein the determining the position of the paging frame (PF) comprises:
determining a position of a target synchronization signal block in the plurality of synchronization signal blocks;
determining, as the position range of the paging frame (PF), a position of a radio frame at a second predetermined offset after the target synchronization signal block; and
determining the position of the paging frame (PF) within the position range of the paging frame (PF).

17. The non-transient computer-readable storage medium according to claim 16, wherein the first predetermined offset is a value configured by a network device, or a value calculated according to a paging parameter configured by a network device.

18. The non-transient computer-readable storage medium according to claim 16, wherein the determining the position of the target synchronization signal block in the plurality of synchronization signal blocks comprises:
calculating a remainder after a terminal identifier divides the number of PFs in the DRX cycle to obtain a result;
calculating a ratio of a multiple to the number of PFs in the DRX cycle, wherein the multiple is a multiple of the DRX cycle relative to a cycle of the synchronization signal block; and
determining the position of the target synchronization signal block according to the product of the result and the ratio, wherein a remainder obtained by dividing the position of the target synchronization signal block by the multiple is equal to the product.

19. The non-transient computer-readable storage medium according to claim 18, wherein the number of PFs in the DRX cycle is a value configured by a network device, or a value determined according to a paging parameter configured by a network device; and the second predetermined offset is a value configured by the network device, or a value determined according to a paging parameter configured by the network device.

20. The non-transient computer-readable storage medium according to claim 18, wherein the determining the position of the paging frame (PF) within the position range of the paging frame (PF) comprises:

determining the position of the paging frame (PF) within the position range of the paging frame (PF) according to an order of a terminal identifier; or calculating a remainder after the terminal identifier divides a first value to obtain a first result, dividing the DRX cycle by the first value to obtain a second result, multiplying the first result by the second result to obtain a first product, determining a frame number of the PF, and determining the position of the paging frame (PF) within the position range of the paging frame (PF) according to an order of the frame number (SFN) of the PF, wherein a result of the frame number of the PF modulus the DRX cycle is equal to the first product, and the first value is the number of PFs in the DRX cycle; or determining the position of the paging frame (PF) within the position range of the paging frame (PF), according to a paging parameter configured by a network device.

* * * * *